United States Patent [19]

Shirasaki

[11] Patent Number: 5,146,511
[45] Date of Patent: Sep. 8, 1992

[54] IMAGE PROCESSING METHOD AND APPARATUS THEREFOR

[75] Inventor: Akihiko Shirasaki, Kyoto, Japan

[73] Assignee: Dainippon Screen Mfg. Co., Ltd., Kyoto, Japan

[21] Appl. No.: 693,504

[22] Filed: Apr. 30, 1991

[30] Foreign Application Priority Data

May 9, 1990 [JP] Japan ................. 2-119066

[51] Int. Cl.⁵ ............................ G06K 9/46
[52] U.S. Cl. ........................ 382/19; 382/21; 382/23; 382/55
[58] Field of Search ............ 382/21, 23, 55, 24–28, 382/19

[56] References Cited

U.S. PATENT DOCUMENTS

| | | | |
|---|---|---|---|
| 3,609,685 | 9/1971 | Deutsch | 382/55 |
| 4,015,239 | 3/1977 | Fujimoto et al. | 382/55 |
| 4,747,551 | 7/1988 | Kobayashi et al. | 382/21 |
| 4,891,750 | 1/1990 | Pastor et al. | 382/21 |
| 4,903,312 | 2/1990 | Sato | 382/21 |

FOREIGN PATENT DOCUMENTS 62-257573 10/1987 Japan .

Primary Examiner—Joseph Mancuso
Attorney, Agent, or Firm—Lowe, Price, LeBlanc & Becker

[57] ABSTRACT

The image processing device finds core linear segments of a linework image by thinning processing; provides a mask area for each end point of the linear segments; integrates the mask areas overlapping with each other into a sum area; with respect to each sum area, finds effective linear segments which have only one end point within each sum area; and judges a feature point in each sum area according to the number of the effective linear segments. Therefore, the device is advantageous in that the feature points are classified more accurately because the linear segments irrelevant to judging the feature points (such as those produced due to distortion and line missing) can be eliminated in the judgment. It is also advantageous in that the data amount to be handled is small and classifying is completed at a high speed since the feature points are classified after vectorization of raster data.

16 Claims, 9 Drawing Sheets

Fig. 11A
Fig. 12A
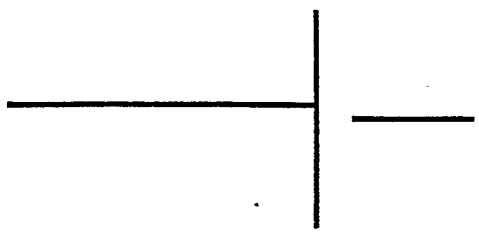
Fig. 11B
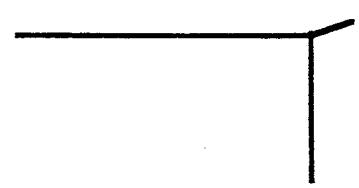
Fig. 12B
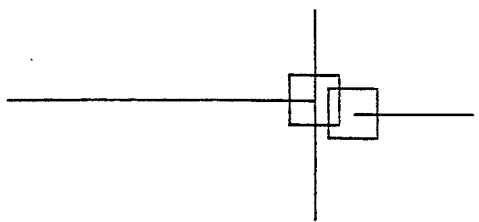
Fig. 11C
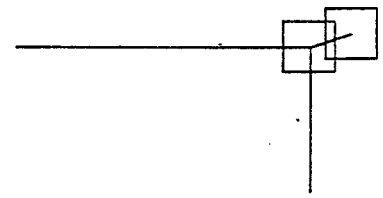
Fig. 12C
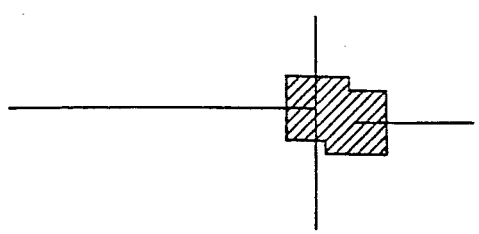
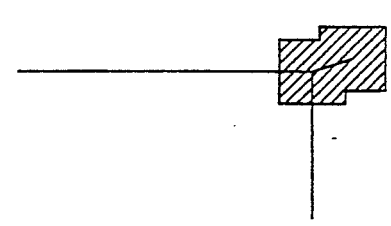

IMAGE PROCESSING METHOD AND APPARATUS THEREFOR

BACKGROUND OF THE INVENTION

1. Field of the Invention

The present invention relates to an image processing method and apparatus therefor for classifying feature points existing in an image.

2. Description of the Related Art

As shown in FIG. 1, linework images generally have several types of feature points such as an open-end point P1, a connection point P2, and a branch point P3. According to the related art, the feature points of a linework image are classified into these types as follows: Firstly the linework image including several linear segments represented by raster data is thinned through thinning processing or core-line formation processing, whereby vector data is obtained representing thinned linear segments of respective parts of the linework image. Each thinned linear segment usually has a width of one pixel. Secondly end points of the thinned linear segments are detected. Then a certain mask area of a predetermined size is applied at each end point. Finally the end point is classified as an N-branch point, where N is an integer, when the mask area includes N pieces of thinned linear segments which have only one end point within the mask area.

FIG. 2A shows a T-shaped linework image, and FIG. 2B shows its thinned linear segments. Linear segments V1, V4, and V5 have only one end point within a mask area MA, and other linear segments V2 and V3 have both their end points within the mask area MA. According to the above method of classification, therefore, the true point in the mask area MA is recognized as a 3-branch point.

In the vicinity of a branch point p3 and a connection point p2, however, a line missing (FIG. 3A) and a protrusion (FIG. 3B) occasionally occurs, and these deformations lead to unsuccessful classifying of the feature points, unless the length and the width of the mask area MA is suitable for the linework images.

The same problems are occur when distortion or break in an image is produced in the process of vectorization of the raster data through the thinning processing or core-line formation processing. For example, in the case of the T-shaped figure explained above (FIG. 2A), some distortion occurs in the vicinity of the 3-branch point Pa, through the thinning processing. In the case of the arrow-shaped figure shown in FIG. 4A, in the process of drawing a core line between outlines (FIG. 4B), a line missing occurs in the vicinity of a 3-branch point Pb as shown in FIG. 4C. Such distortion and line missing may result in incorrect classifying of the feature points.

SUMMARY OF THE INVENTION

An object of the present invention is to resolve the above-described problems and, based on the vectorized linear segments, to facilitate easy and accurate classifying of the feature points existing in an image.

The present invention is directed to an image processing apparatus for finding and classifying feature points existing in a linework image comprising:

(a) linear segment detecting means for detecting linear segments representing core parts of the linework image by thinning processing, to thereby producing vector data representing the linear segments;

(b) mask area establishment means for establishing mask areas for respective end points of the linear segments;

(c) sum area production means for producing a sum area of the mask areas overlapping with each other;

(d) set finding means for, with respect to each of the sum areas, finding a set of effective linear segments which have only one end point within each of the sum areas; and (e) feature point classifying means for classifying the feature points in each of the sum areas according to the number of elements of the set.

The present invention is further directed to an image processing method for finding and classifying feature points existing in a linework image comprising:

(a) detecting linear segments representing core parts of the linework image by thinning processing, to thereby producing vector data representing the linear segments;

(b) establishing mask areas for respective end points of the linear segments;

(c) producing a sum area of the mask areas overlapping with each other;

(d) with respect to each of the sum areas, finding a set of effective linear segments which have only one end point within each of the sum areas; and (e) classifying the feature points in each of the sum areas according to the number of elements of the set.

These and other objects, features, aspects and advantages of the present invention will become more apparent from the following detailed description of the present invention when taken in conjunction with the accompanying drawings.

BRIEF DESCRIPTION OF THE DRAWINGS

In the accompanying drawings:

FIGS. 11A, 11B, and 11C illustrate how a cross shaped figure is processed by the image processing device;

FIGS. 12A, 12B, and 12C illustrate how a right-angled corner figure is processed by the image processing device.

DESCRIPTION OF THE PREFERRED EMBODIMENT

Figure 1:
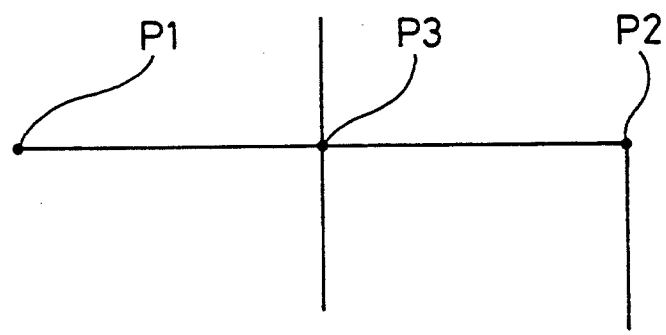
FIG. 1 illustrates feature points in a line image.
Figure 2A:
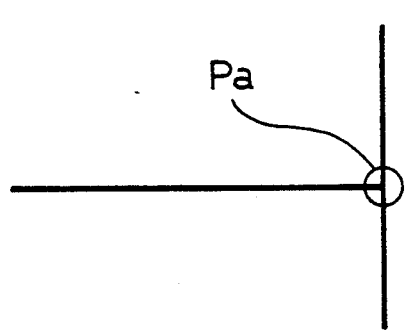
FIGS. 2A and 2B illustrate distortion in a figure caused by thinning processing.
Figure 2B:
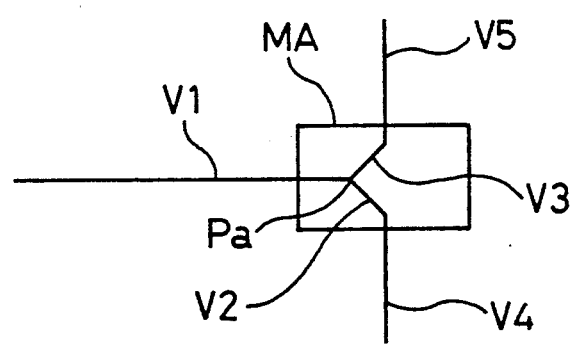
Figure 3A:
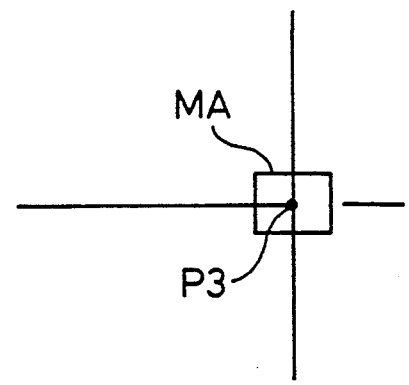
FIGS. 3A and 3B illustrate a line missing and a protrusion inherent in an original image, respectively.
Figure 3B:
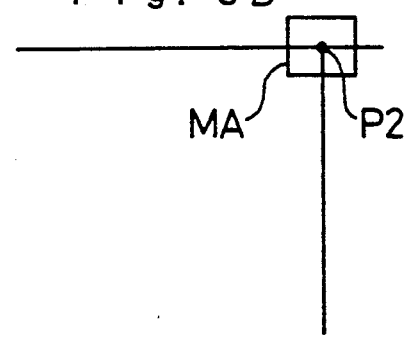
Figure 4A:
FIGS. 4A, 4B and 4C illustrate a line missing that has occurred in the process of vectorization by the core-line formation processing of an arrow-shaped figure.
Figure 4B:
Figure 4C:
Figure 5:
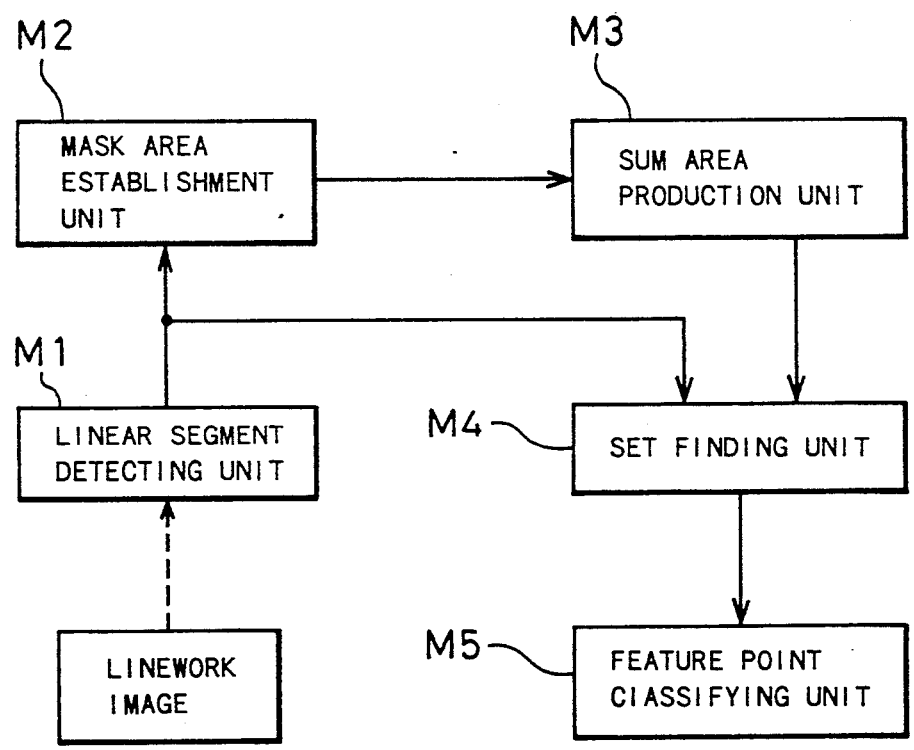
FIG. 5 is a block diagram showing general structure of an image processing device according to the present invention.

FIG. 5 is a block diagram showing general structure of an image processing device according to the present invention.

An image processing device comprises the following elements:

Linear segment detecting unit M1: detecting linear segments of respective parts of a line image in the basis of raster data representing the line image, Mask area establishment unit M2: establishing a mask area at each end point of the linear segments, Sum area production unit M3: producing a sum area of the mask areas for the linear segments, Set finding unit M4: finding a set of these linear segments which have only one end point respectively for each of the sum areas, and Feature point classifying unit M5: classifying the feature points in each of the sum areas according to the number of elements of such a found set.

Since the effective linear segments are defined on the basis of the sum areas obtained from mask areas, the feature points are classified easily and accurately. Compared with processing by a device which establishes simple-shaped mask areas at the segments, each shape of the sum areas reflects the features of the shape of the figure more, and detection of the global features is enabled by the present invention.

Figure 6:
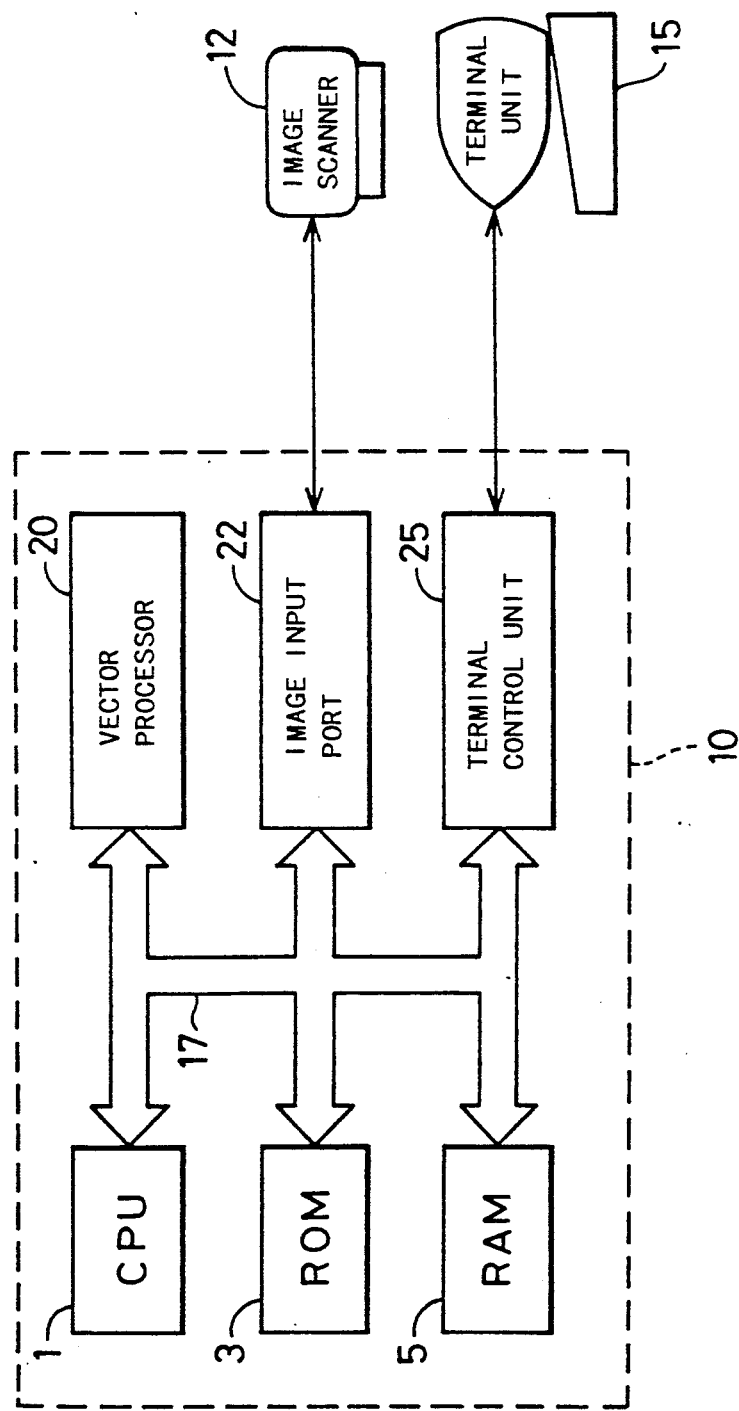
FIG. 6 is a block diagram showing a preferred embodiment of an image processing device according to the present invention.

FIG. 6 shows a block diagram outlining the configuration of the image processing device as an embodiment of the present invention.

As the diagram illustrates, the image processing device comprises a processing unit 10 including a CPU 1, ROM 3 and RAM 5, an image scanner 12 for reading an original image to produce raster data, and a terminal unit 15 for inputting commands for image processing and for displaying processed images.

The processing unit 10 is an arithmetic logic circuit. The CPU 1 performs various processing according to software programs stored in the ROM 3. The CPU 1 is connected, by way of a common bus 17, to a vector processor 20, an image input port 22 directly connected to the image scanner 12, and a terminal control unit 25 directly connected to the terminal unit 15. The image scanner 12 optically scans a original placed on an original holder and produces image data of binary data. The CPU 1 develops the image data in a prescribed area of an image buffer included in the image input port 22 according to a command given through the terminal unit 15. The terminal unit 15 gives a series of instructions to perform various image processing operations to the processing unit 10, and displays images on and after the processing on its display unit.

The vector processor 20 included in the processing unit 10 performs vector processing of the image data (raster data) developed at the image buffer at the image input port 22 and produces vector data of linear segments existing in the original image. The linear segments are core linear segments of respective line parts of the original image. The line parts of the original image usually have a width of more than several pixels, while the linear segments have a width of one pixel. The "vector processing" in this specification denotes line thinning processing to produce vector data representing the linear segments stated above, and a "vector" denotes a linear segment. The vector data for one liner segment has coordinates of a starting point of the vector, its direction and length. Alternatively, the vector data may have coordinates of the starting point and the ending point.

Figure 7:
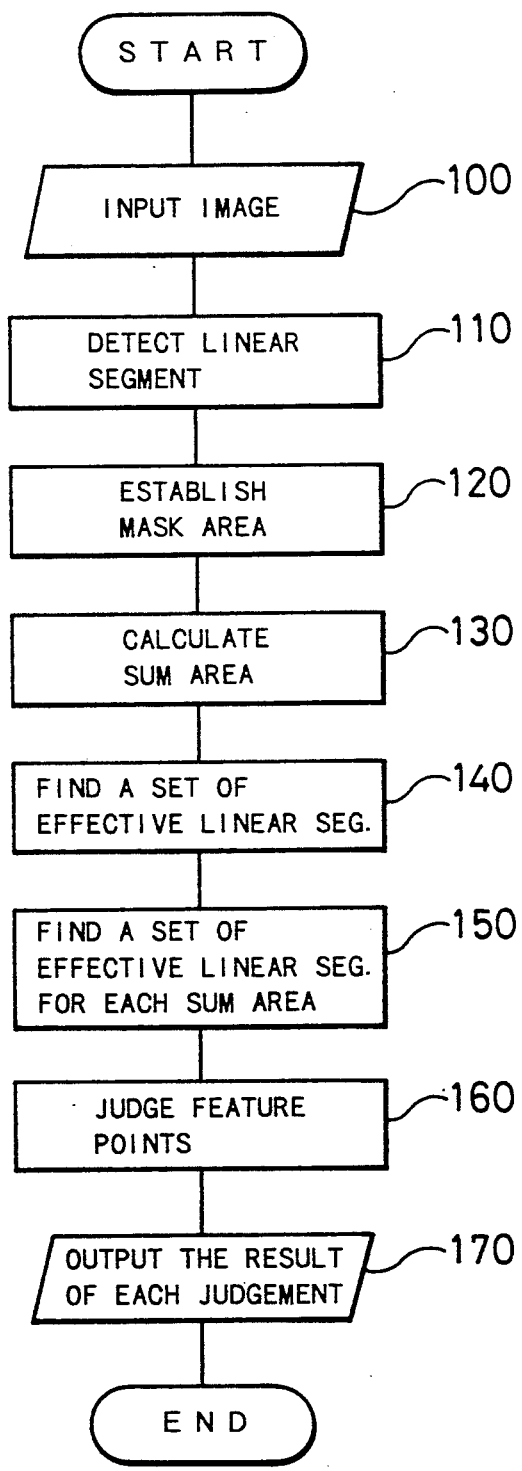
FIG. 7 is a flowchart of the procedure of processing an image.
Figure 8A:
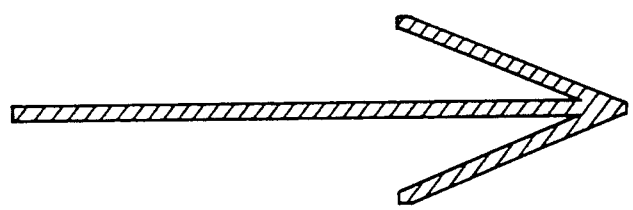
FIGS. 8A and 8B illustrate how mask areas are established on an arrow-shaped figure.
Figure 8B:
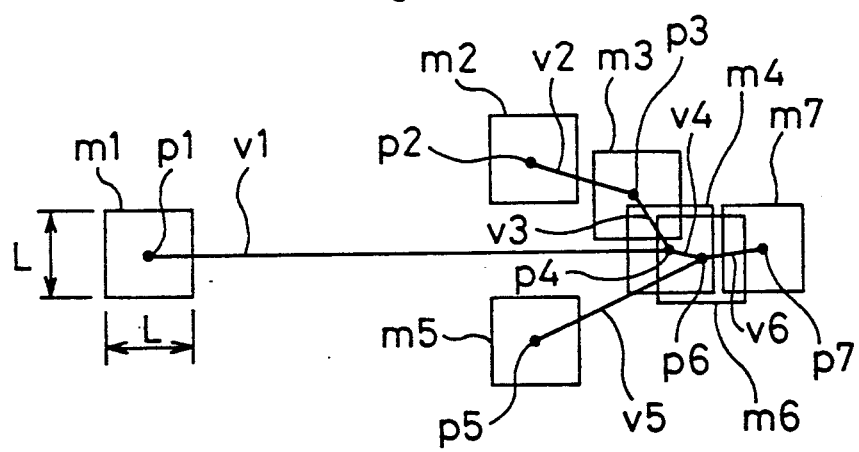

FIG. 7 is a flowchart showing the procedure of feature point finding processing carried out by the processing unit 10. The arrow-shaped figure shown in FIG. 8A is utilized as an example of an original image.

At a step 100, the image processing device carries out an image input operation where the raster data read through the image scanner 12 is developed onto the image buffer included in the image input port 22.

At a step 110, the linear segment detection is carried out on the basis of the raster data. The detection processing of the linear segments is carried out by the vector processor 20. The detection processing has the steps of: performing the thin-line processing of the original image; recognizing of the thin-line image as a set of linear segments longer than prescribed length; and storing the vector data of the linear segments in a predetermined area of RAM 5. Table 1 shows the vector data of the linear segments where the vector data consist of coordinates of the starting point and ending point.

TABLE 1

| Vector No. | Starting point coordinates | | Ending point coordinates | |
|---|---|---|---|---|
| | SX | SY | EX | EY |
| v1 | sx1 | sy1 | ex1 | ey1 |
| v2 | sx2 | sy2 | ex2 | ey2 |
| . | . | . | . | . |
| . | . | . | . | . |
| v6 | sx6 | sy6 | ex6 | ey6 |

At a step 120, at each end point of the linear segments is established a mask area while the end point is the center of the mask area. Then a sum area of the mask areas is calculated at a step 130. The "sum area" is an area which is formed of mask areas overlapping with each other. In the case of this embodiment, the shape of the mask area is a square with an end point of a segment as its center and each side has a length of L; the information of each area is stored in a prescribed area inside the RAM 5 as shown in Table 2, which includes location, size, direction and shape.

TABLE 2

| Mask area No. | Location, size, direction, and shape of the mask area | Sum area No. |
|---|---|---|
| m1 | ... | m10 |
| m2 | ... | m20 |
| m3 | | m30 |
| m4 | | m30 |
| m5 | | m50 |
| m6 | | m30 |
| m7 | ... | m30 |

Figure 9:
FIG. 9 shows one type of a mask area.

The size of the mask area may be prescribed in advance or established according to the maximum line width of an original image, reading resolution of the image scanner, etc. As for an ordinary figure, its desirable width is 1.5 or 2 times the maximum line width. Its shape is not limited to a square but various shapes such as a rectangle, a circle, or an oval as shown in FIG. 9.

In the case of the arrow-shaped figure shown in FIG. 8A, linear segments v1 to v6 are obtained through vectorization due to a slight distortion in the original. At each end point of the linear segments v1 to v6, mask areas m1 to m7 of L×L pixel matrix are established (step 120). For each mask area, the number of linear segments which have only one end point in the mask area are counted. The number of these linear segments are as follows:

TABLE 3

| mask area | number of linear segments | concerned linear segments |
|---|---|---|
| m1 ... | 1 | v1 |
| m2 ... | 1 | v2 |
| m3 ... | 2 | v2, v3 |
| m4 ... | 4 | v1, v3, v5, v6 |
| m5 ... | 1 | v5 |
| m6 ... | 4 | v1, v3, v5, v6 |
| m7 ... | 1 | v6 |

Since the mask areas m4 and m6 include both end points of the linear segment v4, the linear segment v4 is not counted in these mask areas.

Figure 10:
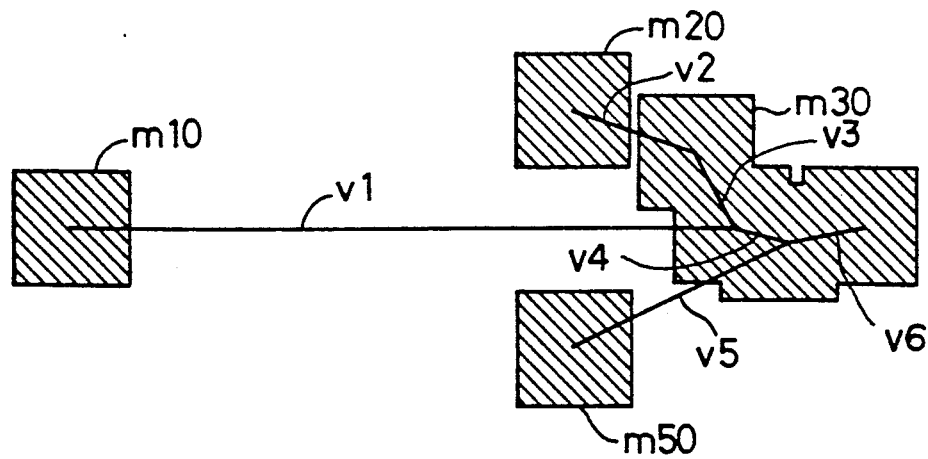
FIG. 10 illustrates how sum areas are established.

At the step 130, four sum areas m10, m20, m30 and m50, as shown in FIG. 10, are recognized. The sum area m30 here is a union of the mask areas m3, m4, m6, and m7. The relation between each mask area and each sum area is stored as interrelated data as shown in Table 2.

After recognition of the sum areas in this way, a set of effective linear segments are found for each mask area at a step 140. The effective linear segment is a segment which has only one end point within the corresponding sum area. The number of effective linear segments for respective mask areas m1 to m7 are as follows:

TABLE 4

| mask area | number of effective linear segment | effective linear segment |
|---|---|---|
| m1 ... | 1 | v1 |
| m2 ... | 1 | v2 |
| m3 ... | 1 | v2 |
| m4 ... | 2 | v1, v5 |
| m5 ... | 1 | v5 |
| m6 ... | 2 | v1, v5 |
| m7 ... | 0 | N/A |

Since the mask areas m3, m4, m6, and m7 constitute the sum area m30, the linear segments v3, v4, and v6 which have both end points within the sum area m30 are not counted as effective linear segment.

At a step 150, a set of the effective linear segments for each sum area are produced. The effective linear segments for each of the sum areas m10, m20, m30, and m50 are found by collecting the effective linear segments in the mask areas m1 to m7 which constitute the sum area. Table 5 shows the number of effective linear segments thus found:

TABLE 5

| sum mask area | number of effective linear segment | effective linear segment |
|---|---|---|
| m10 | 1 | v1 |
| m20 | 1 | v2 |
| m30 | 3 | v1, v2, v5 |
| m50 | 1 | v5 |

Based on these results, the features of each sum area are decided at a step 160 as follows: In this step, each sum area is assumed to have one feature point of the thinned linework image without distortion and line missing. Then the type of the feature point of each sum area is judged according to the number of effective linear segments in that sum area. Since the number of effective linear segments is one for the sum areas m10, m20 and m50, its feature points are judged to be open-end points. Since the number of effective linear segments is three for the sum area m30, its feature point is judged to be a 3-branch point. Finally the result of each judgment is outputted to the terminal unit 15 at a step 170 and, the present processing routine is terminated.

According to the image processing device described above, each sum area is assumed to have one feature point, and the type of the feature point is decided according to the number of the effective linear segments. Therefore the feature points can be easily and accurately classified into respective types regardless of the distortion and line missing caused by vectorization processing (or thinning processing) of an original linework image and the line missing and protrusion inherent in an original linework image. That is, the shape of a sum area follows the shape of a figure to be processed and those linear segments produced by distortion or line missing are not counted as the effective linear segments. For example, a 4-branch point with a line missing as shown in FIGS. 11A, 11B, and 11C, or a connection point with a protrusion as shown in FIGS. 12A, 12B, and 12C are judged properly; although these figures are often misjudged by conventional device.

Figure 13A:
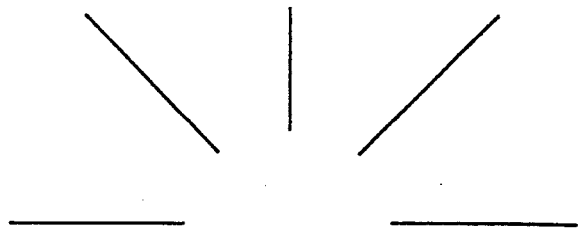
FIGS. 13A, 13B, and 13C illustrate how eight-line-crossed figure are processed by the image processing device.
Figure 13B:
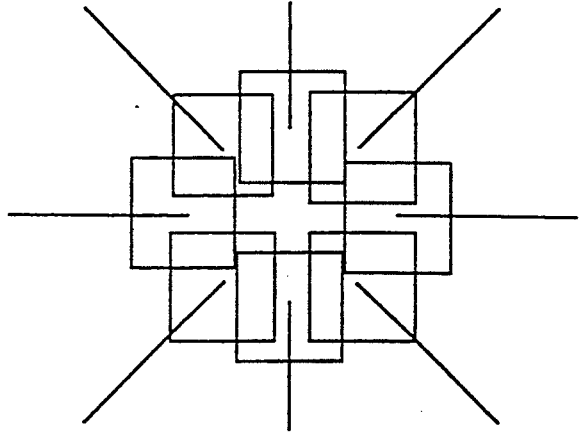
Figure 13C:
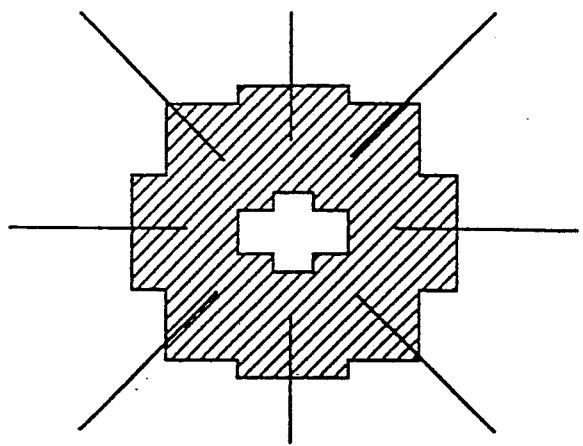

The sum area becomes larger as the feature point includes the larger number of branches; thus the classification of the feature point can be performed with the larger sum area. Therefore even a 5-branch point can be classified by one cycle of the processing described above, and thus such a complicated process as to integrate a 4-branch point and a 3-branch point into a 5-branch point is not needed. This advantage becomes more explicit as the number of branches increases. For example, even in a case of a feature point having eight branches with a missing part in the center which is caused by the core-line formation processing, as shown in FIGS. 13A, 13B and 13C, the image processing device can easily recognize the feature point as an 8-branch point.

Moreover, the image processing device is advantageous because it carries out processing after vectorization, and thus the amount of data to be handled is small and high-speed processing is available.

With all these results, feature point classification is possible by a compact system and a variety of processing stated below can be done simply. For example, pre-processing of recognizing image configurations in a layout paper used in the printing and platemaking industry can be carried out easily. The image processing device is also advantageous in increasing the accuracy of figurative recognition of the layout paper figures and decreasing the need for accurate layout paper making.

Incidentally, a mask area may be of an oval with its longer axis in the linear segment direction. The mask area size may be adjusted according to the line width of an original linework image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for finding and classifying feature points existing in a linework image, said feature points being points having a plurality of branches and end points of said linework image, comprising:

(a) linear segment detecting means for detecting linear segments representing core parts of said linework image by thinning processing, to thereby producing vector data representing said linear segments;

(b) mask area establishment means for establishing mask areas for respective end points of said linear segments identified by said vector data;

(c) sum area production means for producing a sum area of said mask areas overlapping with each other;

(d) set finding means for, with respect to each of said sum areas, finding a set of effective linear segments which have only one end point within each of said sum areas; and (e) feature point classifying means for classifying said feature points in each of said sum areas according to the number of elements of said set.

2. An image processing apparatus in accordance with claim 1, wherein said feature point classifying means judges said feature points as end points if the number of effective linear segments is one; judges said feature points as connection points if the number of effective linear segments is two; and judges said feature points as N-branch points having N pieces of branches, where N is an integer at least three, if the number of linear segments is at least three.

3. An image processing apparatus in accordance with claim 1, wherein said mask area establishment means establishes area selected from a group consisted of square, rectangle, circle, and oval.

4. An image processing apparatus in accordance with claim 3, wherein said mask area establishment means establishes said mask areas whose width in a first direction parallel to a longitudinal direction of said linear segment is longer than a width in second direction perpendicular to said first direction.

5. An image processing apparatus in accordance with claim 1, wherein said mask area establishment means comprises:

(b1) linear segment width measuring means for measuring a width of said linework image; and (b2) area size adjusting means for adjusting size of said mask areas in proportion to said width.

6. An image processing apparatus in accordance with claim 1, wherein said mask area establishment means further comprises;

mask area information storage means for storing information of each of said mask areas, said information including at least coordinates of location of said mask areas, while allotting a unique identity number to every mask area.

7. An image processing apparatus in accordance with claim 1, wherein said sum area production means comprises:

(c1) identity number assigning means for assigning identity number to each mask area, while assigned an identical identity number to those mask areas which overlap at least partly with each other; and (c2) identical sum area judgement means for judging mask areas allotted with an identical identity number to be included in an identical sum area.

8. An image processing apparatus in accordance with claim 1, wherein said feature point classifying means operates after production of each said sum area and after finding the number of elements in said set of effective linear segments having only one end point within each said sum area.

9. An image processing method for finding and classifying feature points existing in a linework image, said feature points being points having a plurality of branches and end points of said linework image, comprising:

(a) detecting linear segments representing core parts of said linework image by thinning processing, to thereby producing vector data representing said linear segments;

(b) establishing mask areas for respective end points of said linear segments identified by said vector data;

(c) producing a sum area of said mask areas overlapping with each other;

(d) with respect to each of said sum areas, finding a set of effective linear segments which have only one end point within each of said sum areas; and (e) classifying said feature points in each of said sum areas according to the number of elements of said set.

10. An image processing method in accordance with claim 9, wherein said step (e) comprises the steps of:

(e1) judging said feature points as end points if the number of effective linear segments is one;

(e2) judging said feature points as connection points if the number of effective linear segments is two; and (e3) judging said feature points as N-branch points having N pieces of branches, where N is an integer at least three, if the number of linear segments is at least three.

11. An image processing method in accordance with claim 9, wherein said each mask area is selected from the group consisted of square, rectangle, circle, and oval.

12. An image processing method in accordance with claim 11, whose width in a first direction parallel to a longitudinal direction of said linear segment is longer than a width in second direction perpendicular to said first direction.

13. An image processing method in accordance with claim 9, wherein said step (b) comprises the steps of:

(b1) measuring a width of said linework image; and (b2) adjusting size of said mask areas in proportion to said width.

14. An image processing method in accordance with claim 9, where information of each of said mask areas is stored, said information including coordinates of location of said mask areas, while allotting a unique identity number to every mask area.

15. An image processing method in accordance with claim 9, wherein said step (c) comprises the steps of:

(c1) assigning identity number to each mask area, while assigning an identical identity number to those mask areas which overlap at least partly with each other; and (c2) judging mask areas allotted with an identical identity number to be included in an identical sum area.

16. An image processing method in accordance with claim 9, wherein said step of classifying said feature points in said sum areas is performed after production of each said sum area and after finding the number of elements in said set of effective linear segments having only one end point within each said sum area.

* * * * *